Feb. 6, 1945.  C. L. HEATER  2,368,985
BRAKE ROTOR
Filed Oct. 13, 1943
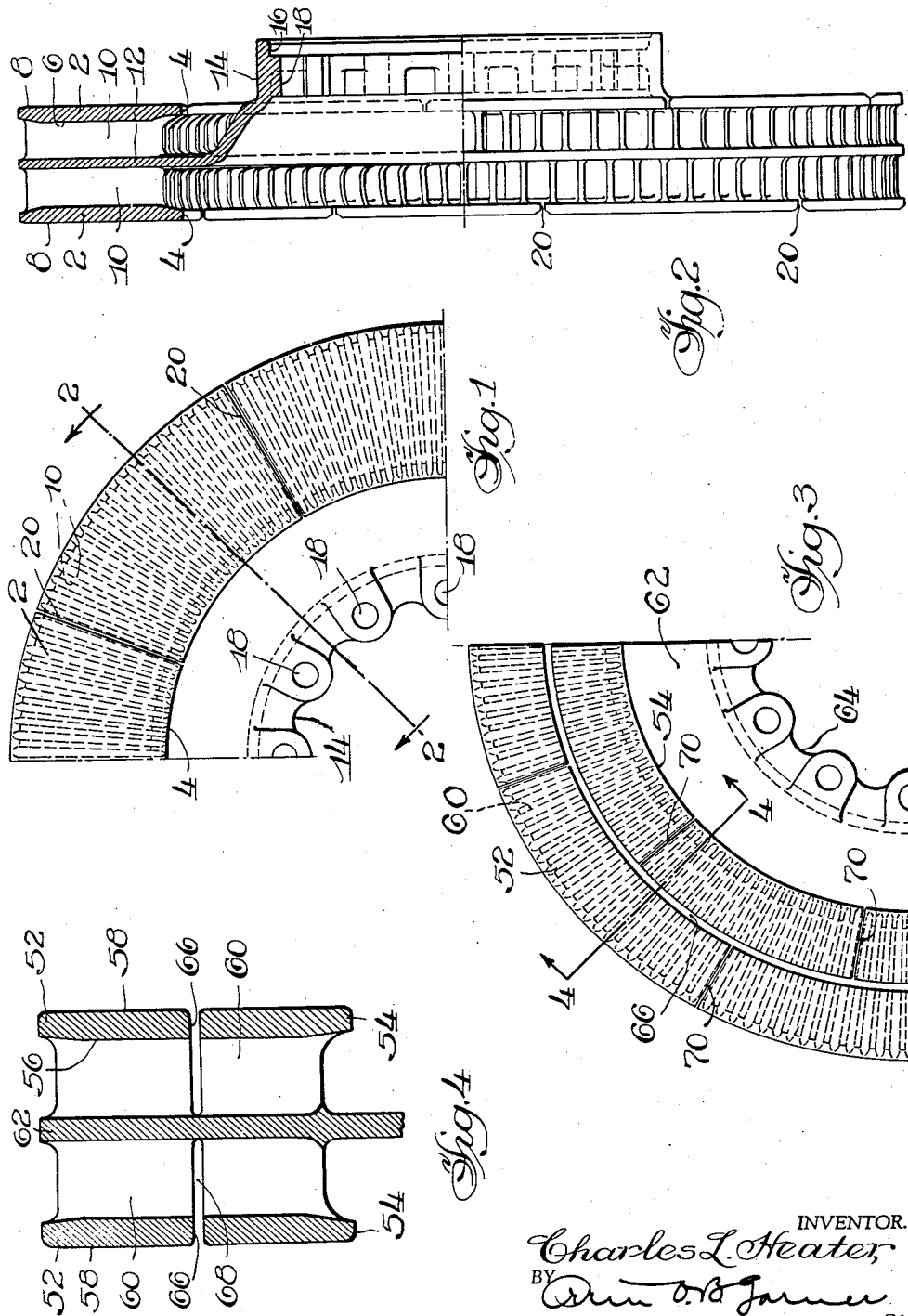
INVENTOR.
Charles L. Heater,
BY
Atty.

Patented Feb. 6, 1945

2,368,985

UNITED STATES PATENT OFFICE 2,368,985

BRAKE ROTOR

Charles L. Heater, Chicago, Ill., assignor to American Steel Foundries, Chicago, Ill., a corporation of New Jersey Application October 13, 1943, Serial No. 506,037

10 Claims. (Cl. 188—218)

This invention relates to brake equipment and more particularly to a brake disc or rotor of the centrifugal or peripheral type capable of circulating fluid therethrough during rotation of the disc. My novel rotor is particularly adapted for railway brake equipment, but may be utilized for any purpose to which it may be adapted, and it will be understood that my novel rotor is particularly designed to rotate in air, however, it will function effectively in any other suitable fluid medium, such as oil.

The present invention is an improvement on the novel design of rotor illustrated in co-pending application, Serial No. 470,551, filed December 30, 1942, in the United States Patent Office in the name of Carl E. Tack.

The general object of the present invention is to provide a brake rotor of the centrifugal type in which the friction plates are slotted. While I am aware that the broad principle of slotting friction plates to permit expansion and contraction thereof is old in the art, as illustrated, for example, in United States Letters Patent 2,138,837, issued December 6, 1938, to Cadman, it is my purpose to design a brake rotor in which the friction plate slots serve a dual function in affording fluid passages through the plates and in permitting expansion and contraction thereof due to the heat developed during a braking operation.

It will be understood by those skilled in the art that films of fluid rotate with and adhere to the friction surfaces of the plates, these films acting as insulators to diminish heat dissipation from said surfaces, and it is a principal object of the present invention to provide means for breaking up or displacing these insulating films by providing suitable fluid passages through the friction plates.

In the drawing,

Figure 1 is a fragmentary side elevation of a brake rotor embodying my invention, only one-quarter of the rotor being illustrated inasmuch as it is a symmetrical annular member.

Figure 2 is a composite view, the top half thereof being a sectional view taken in the radial plane indicated by the line 2—2 of Figure 1, and the bottom half being an edge elevation.

Figure 3 is a fragmentary side elevation of a modification of my invention, only one-quarter of the rotor being illustrated, and Figure 4 is a sectional view taken in the radial plane indicated by the line 4—4 of Figure 3.

Describing my invention in detail and referring first to the embodiment thereof illustrated in Figures 1 and 2, my novel rotor comprises the spaced friction plates 2, 2 preferably of annular form and having respectively the central openings 4, 4 therethrough to afford air inlets to the chamber 6 between the plates. The plates 2, 2 are formed with friction surfaces 8, 8 (Figure 2) on the remote surfaces thereof, and said plates are connected by means of transverse blades 10, 10 to the central support member 12 which is disposed between the plates. It will be understood that the blades 10, 10 serve as braces or columns to resist braking forces applied to the surfaces 8, 8, and said blades also function to throw air outwardly from the chamber 6 during rotation of the rotor, which thus acts as a centrifugal blower, air being drawn into the chamber through the openings 4, 4, and being thrown outwardly by the blades 10, 10 from the outer periphery of the rotor.

The support member 12 may be somewhat bell-shaped in form and may be provided on the inner perimeter thereof with a hub 14 having a bore 16 (Figure 2) for the reception of positioning means on an associated rotating member to which the rotor may be secured by any convenient means extending through openings 18, 18 which may be conveniently formed in the hub 14 for that purpose.

It will be readily apparent to those skilled in the art that heat will be developed in the plates 2, 2 as braking pressure is applied to the surfaces 8, 8 whereby these plates will tend to expand and contract radially and circumferentially as they are alternately heated and cooled. This expansion or contraction may tend to cause distortion or cracks or checks in the plates and to avoid this condition, I provide radial slots 20, 20 extending through the plates 2, 2, thus facilitating expansion and contraction thereof as above described.

As will be understood, the air adjacent the surfaces 8, 8 rotates therewith in what may be termed laminar flow, inasmuch as said air tends to rotate in layers, the rate of rotation of said layers being proportionate to their distance from the surfaces 8, 8, and it will also be understood that the layer of air immediately adjacent each surface 8 tends to rotate at substantially the same speed therewith and to form an insulating film thereon, thereby diminishing heat dissipation from the surface. The slots 20, 20 may afford displacement of the films of air normally rotating with the surfaces 8, 8 of the respective plates 2, 2 by affording air passages therethrough, said passages communicating with the chamber 6. Thus, as differences in air pressure are built up ahead of and behind the friction shoes engaging the surfaces 8, 8, air may pass outwardly and inwardly through these slots 20, 20, thereby displacing the insulating films of air on the surfaces 8, 8 and augmenting heat dissipation therefrom.

Figures 3 and 4 illustrate a modification of my invention in which the rotor comprises the spaced friction plates 52, 52 each being of annular form with the central opening 54 affording air inlet means to the chamber 56 between the plates, said plates being provided with friction surfaces 58, 58 on the remote sides thereof. Transverse blades 60, 60 connect the plates 52, 52 to the support member 62 which projects therebetween, said member 62 being formed on its inner perimeter with a hub 64 (Figure 3) formed and arranged for connection to an associated rotating element as in the previously described embodiment of my invention. Each plate 52 is provided with an annular concentric slot 66 which extends inwardly as at 68 through the adjacent blades 60, 60, and joining each slot 66 are a plurality of radial slots 70, 70 dividing the plate 52 into a plurality of segments.

It will be understood that as in the previous embodiment of my invention, the slots 66, 66 and 70, 70 serve a dual function in permitting expansion and contraction of the plates 52, 52 and in affording air passages through which air may flow, thus displacing the insulating films of air normally rotating with the surfaces 58, 58.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. A brake rotor comprising an annular plate, at least one annular slot through said plate dividing the same into a plurality of radially spaced segments, a friction face on one side of said plate, a support member adjacent the opposite side of said plate, fluid circulating means comprising blades joining each segment to said member, the blades associated with each segment being spaced from the other blades, and means for attaching said rotor to an associated rotating element.

2. A brake rotor comprising an annular plate, at least one ring-like slot through said plate dividing the same into a plurality of radially spaced segments, a plurality of slots through each segment dividing the same into circumferentially spaced pieces, a friction face on one side of said plate, a support member adjacent the opposite side of said plate, blower blades joining each segment to said member, the blades associated with each segment being spaced from the other blades, and means for attaching said rotor to an associated rotating element.

3. In a brake rotor, a pair of spaced plates defining a fluid chamber therebetween, fluid inlet means for said chamber, a support member intermediate said plates, at least one annular slot through each plate dividing the same into a plurality of segments, substantially radial blades joining each segment to said member, the blades connected to each segment being spaced from the rest of the blades, and means for attaching said rotor to an associated rotating element.

4. In a brake rotor, a pair of spaced plates defining a fluid chamber therebetween, fluid inlet means for said chamber, support means intermediate said plates, at least one annular slot through each plate substantially concentric therewith and dividing the same into a plurality of segments, a plurality of slots through each segment dividing the same into spaced pieces, substantially radial blades connecting each segment to said support means, the blades connected to each segment being spaced from the other of said blades, and means for attaching said rotor to an associated rotating element.

5. In a brake rotor, a pair of spaced friction plates defining a fluid chamber therebetween, at least one of said plates having substantially central fluid inlet means therethrough communicating with said chamber, friction surfaces on the remote sides of said plates, at least one ring-like slot through each plate extending entirely therearound and dividing the plate into a plurality of segments, said slot interrupting the associated friction surface and communicating with said chamber, support means in said chamber, means for creating a fluid current into said chamber from said inlet means and outwardly from said chamber through said slots comprising a plurality of blades joining each plate to said support means, the blades associated with each segment being independent of the other blades, and means for attaching said rotor to an associated rotating element.

6. In a brake rotor, a plurality of annular concentric coplanar plates having coplanar friction surfaces on one side thereof, support means adjacent said plates at the opposite side thereof comprising means for attachment to an associated rotating element, and blower blades joining each plate to said support means, the blower blades associated with each plate being independent of the other of said blades.

7. In a brake ring, a pair of spaced friction plates having friction faces on their remote surfaces, support means between said plates, blade means joining each of said plates to said support means, a slot in each face extending therearound and extending inwardly to said support means through the associated blade means, at least one of said plates having a substantially central fluid inlet communicating with the space therebetween, and means for attaching said brake ring to an associated rotating element.

8. In a brake rotor, a brake ring comprising a plurality of spaced plates, friction surfaces on opposite sides of said ring, each of said surfaces being interrupted by at least one annular slot and a plurality of substantially radial slots communicating with the space between said plates to afford a fluid outlet from said space, fluid inlet means communicating with said space, and means for creating a fluid current into said space through said inlet means and outwardly through said slots, said second-mentioned means comprising blade means carried by said ring within said space.

9. In a brake rotor, a brake ring comprising a pair of spaced friction plates defining an intermediate fluid chamber, friction surfaces on the remote sides of said plates, a support member in said chamber, each of said plates having at least one ring-like slot interrupting its friction surfaces and dividing said plate into a plurality of segments, fluid inlet means for said chamber, and means for producing a fluid current into said chamber through said inlet means and outwardly from said chamber through said slot, said current producing means comprising blade means connecting each of said plates to said support member.

10. In a brake rotor, a brake ring comprising a pair of spaced friction plates defining an intermediate fluid chamber, friction surfaces on the remote sides of said plates, a support member in said chamber, each of said plates having at least one ring-like slot interrupting its friction surfaces and dividing said plate into a plurality of segments, a plurality of slots through each segment dividing the same into a plurality of spaced pieces, fluid inlet means for said chamber, and means for producing a fluid current into said chamber through said inlet means and outwardly from said chamber through said slots, said current producing means comprising a plurality of spaced radial blades connecting each of said plates to said support member.

CHARLES L. HEATER.